(12) United States Patent
Jongsma et al.

(10) Patent No.: US 12,436,278 B2
(45) Date of Patent: *Oct. 7, 2025

(54) METHOD AND SYSTEM FOR MAPPING A REGION

(71) Applicant: FNV IP B.V., Leidschendam (NL)

(72) Inventors: Arnoud Marc Jongsma, Leidschendam (NL); Vsevolod Olegovych Kovalenko, Leidschendam (NL)

(73) Assignee: FNV IP B.V., Leidschendam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/562,802

(22) PCT Filed: May 20, 2022

(86) PCT No.: PCT/NL2022/050280
§ 371 (c)(1),
(2) Date: Nov. 20, 2023

(87) PCT Pub. No.: WO2022/245217
PCT Pub. Date: Nov. 24, 2022

(65) Prior Publication Data
US 2024/0241252 A1 Jul. 18, 2024

(30) Foreign Application Priority Data
May 21, 2021 (NL) .................................. 2028276

(51) Int. Cl.
*G01S 15/89* (2006.01)
*G01S 7/536* (2006.01)
(Continued)

(52) U.S. Cl.
CPC .......... *G01S 15/8904* (2013.01); *G01S 7/536* (2013.01); *G01S 15/003* (2013.01); *G01S 15/325* (2013.01)

(58) Field of Classification Search
CPC .... G01S 15/8904; G01S 7/536; G01S 15/003; G01S 15/325; G01S 15/88
See application file for complete search history.

(56) References Cited

U.S. PATENT DOCUMENTS 3,882,444 A * 5/1975 Robertson ............... G01S 15/02
367/92
3,982,426 A * 9/1976 Newhouse ............. G01N 29/50
73/612

(Continued)

FOREIGN PATENT DOCUMENTS

| AU | 2022275643 A1 * 11/2023 | ........... G01S 15/325 |
| AU | 2022277013 A1 * 11/2023 | ........... G01S 15/325 |

(Continued)

*Primary Examiner* — Daniel Pihulic
(74) *Attorney, Agent, or Firm* — Polsinelli PC

(57) ABSTRACT

A method and system for mapping a target region (60) of space with signal scatterers. The method involves moving a signal transmitter (26) and/or signal receiver (46) along a respective trajectory (34, 54) relative to the target region, and meanwhile transmitting a probing signal (62) towards the target region, this probing signal including a time sequence of noise (70) with a predefined bandwidth, receiving a response signal (76) composed of components resulting from scattering of the probing signal (62) by respective portions of the target region, and repeatedly determining positions ($Q_T$, $Q_R$) of the transmitter and/or receiver. The method further involves transforming the probing signal (62) into multiple test signals, each test signal being associated with a propagation path via a portion of the target region, and correlating each of the test signals with the response signal (76) in the time domain, to generate a map of correlation strength values associated with the portions of the target region.

20 Claims, 5 Drawing Sheets

(51) Int. Cl.
   *G01S 15/00*      (2020.01)
   *G01S 15/32*      (2006.01)

(56) References Cited

U.S. PATENT DOCUMENTS

| | | | | |
|---|---|---|---|---|
| 4,216,537 | A  * | 8/1980 | Delignieres | ............... G01V 1/38 |
| | | | | 367/91 |
| 10,784,993 | B1 * | 9/2020 | Batra | .................... H04L 1/1887 |
| 2014/0121521 | A1 * | 5/2014 | Poland | ................... A61B 8/145 |
| | | | | 600/447 |
| 2018/0217243 | A1 * | 8/2018 | Sasakura | ................. G01S 15/89 |
| 2018/0229057 | A1 * | 8/2018 | Fontanarosa | ........ A61N 5/1049 |
| 2020/0121281 | A1 * | 4/2020 | Dagdeviren | ......... A61B 8/4477 |
| 2024/0241252 | A1 * | 7/2024 | Jongsma | ............. G01S 15/8904 |
| 2024/0248204 | A1 * | 7/2024 | Jongsma | ............... G01S 15/325 |
| 2024/0329223 | A1 * | 10/2024 | Muehlberghuber | .. G01S 7/5208 |

FOREIGN PATENT DOCUMENTS

| | | | | |
|---|---|---|---|---|
| AU | 2023378847 A1 * | 5/2025 | ............ | G01S 7/536 |
| AU | 2023378848 A1 * | 5/2025 | ............ | G01S 7/536 |
| AU | 2023381752 A1 * | 5/2025 | ............ | G01S 7/527 |
| AU | 2023381753 A1 * | 5/2025 | ............ | G01S 15/325 |
| WO | WO-2022245216 A1 * | 11/2022 | ............ | G01S 7/536 |
| WO | WO-2022245217 A1 * | 11/2022 | ............ | G01S 7/536 |
| WO | WO-2024099614 A1 * | 5/2024 | ........ | G01S 15/8904 |
| WO | WO-2024099615 A1 * | 5/2024 | ............ | G01V 1/001 |
| WO | WO-2024104936 A1 * | 5/2024 | ............ | G01S 15/003 |
| WO | WO-2024104937 A1 * | 5/2024 | ............ | G01S 15/003 |
| WO | WO-2025132153 A1 * | 6/2025 | | |

* cited by examiner

METHOD AND SYSTEM FOR MAPPING A REGION

CROSS REFERENCE TO RELATED APPLICATIONS

The present application is a National Stage entry of international Application No. PCT/NL2022/050280, filed on May 20, 2022, which claims priority to Netherlands Application Number 2028276, fled on May 21, 2021, both of which are incorporated by reference in their entireties.

TECHNICAL FIELD

The invention relates to a method and a system for mapping a target region. Furthermore, the invention relates generally to computer program product and a computer readable medium for executing the method.

BACKGROUND ART

Approximately 70% of the earth surface is covered by ocean. Mapping the ocean-floor in deep water poses great challenges, both from a technical and an economic perspective. This may be a reason why only as much as 20% of the ocean floor has actually been explored and mapped in detail.

Mapping of a submerged surface and/or detecting of structures that are present in/on this surface may be performed by a floating platform (e.g. a vessel) or an underwater platform carrying a sonar transceiver. Such a platform may transmit acoustic signals in a predetermined direction away from the platform and towards the intended target region, and then receive and process the acoustic response signal.

Pulse-based mapping systems rely on the round-trip time for the acoustic signals propagating through the water. The instantaneous location of the platform, the direction of transmission and reception of the acoustic pulses, and the round trip time for pulses returning from the submerged surface are recorded. Processing of the received sonar pulses and associated spatial and timing relations may yield a geometrical map of the surface area that was covered by the signal transmissions.

The roundtrip time for pulsed systems increases as function of propagation distance. This renders acoustic imaging increasingly more difficult for surfaces that are located at greater depths. One known approach to mitigate this is to use a surface vessel with a continuous wave or frequency modulated multi-beam acoustic array. The associated operational costs are typically high, while the achievable imaging resolution remains relatively low. Another known approach involves bringing a subsea vehicle (e.g. a towed or autonomous underwater vehicle) close to the seabed. The operational costs are also high in this case, due to the required presence of operators and a support vessel, and the inherent complexity in the coordination of the equipment.

It would be desirable to provide a system and method for acoustic mapping of an underwater surface, for which the obtainable mapping resolution is relatively high but for which the operational costs may be significantly reduced.

SUMMARY OF INVENTION

According to a first aspect of the invention, there is provided a method for mapping a target region of space in accordance with claim 1. This target region is composed of multiple volume elements, and at least some of these elements accommodate objects or local non-uniformities that cause an incoming signal to scatter. The method involves the following actions:

providing a signal transmitter and a signal receiver within signal range of the signal transmitter;

moving at least one of the signal transmitter and the signal receiver along a respective trajectory relative to the target region, and while moving transmitter and/or receiver:

continuously transmitting, with the signal transmitter, a probing signal towards the target region, this probing signal including a time sequence of noise (70) with a predefined bandwidth;

continuously receiving, with the signal receiver, a response signal composed of a plurality of signal components that result from scattering of the probing signal by respective ones of the portions of the target region, and during transmitting and receiving, repeatedly determining instantaneous positions of the moving at least one of the signal transmitter and receiver.

The method further includes:

transforming the probing signal into a plurality of test signals, each test signal being associated with a signal propagation path via a selected portion of the target region, and correlating each of the plurality of test signals with the response signal in the time domain, to generate a map of correlation strength values, each respective value being associated with a corresponding one of the selected portions of the target region, wherein the transforming of the probing signal for each selected portion of the target region comprises:

calculating a total delay time $\Delta t$ based on a propagation speed ($v_s$) within the signal carrying medium and on a propagation distance from the instantaneous position $Q_T$ of the signal transmitter at the time $t_T$ that the probing signal was transmitted, towards the selected portion where the probing signal was scattered, and further towards the instantaneous position $Q_R$ of the signal receiver at the time $t_R$ the response signal was received;

shifting parts or all of the probing signal in time, by correcting for the calculated total delay time $\Delta t$, to obtain the test signal $\rho$ associated with the selected portion of the target region. The time sequence of noise with a predefined bandwidth can be shorter, or as long as the method for mapping a target region itself, or even as long as a whole survey. The time sequence of noise is herewith defined as an information-containing sequence which can modulate a carrier frequency or be transmitted directly and having a bandwidth B (in Hz or kHz) whose lower and upper limits depend on the application and has the autocorrelation function approximating Kronecker's in that it consists of a single peak at t0=0 and can be considered as zero at a different given time. The peak has a width of 1/B and its maximum value strictly grows with the length of the information-containing sequence. The power of the information-containing sequence is nearly stationary throughout the transmission. A survey is here designated as the action of mapping a plurality of target regions, for example subsequently. In the context of the present invention, the predefined bandwidth such as in the range from 10 Hz to 110 Hz, or from 0.1 to 12 kHz, or from 2 to 12 kHz, or from 2 kHz to 15 kHz or from 2 kHz to 150 kHz, depending on the applications.

A traditional beamforming process relies on the assumption that signal waves with a macroscopically flat wavefront hi the physical detection array, and manipulates the phase or time-delay of each receiver element such that all elements are in phase for a particular one- or two-dimensional direction or for a particular point in three-dimensional space. In a physical array, adding the (appropriately delayed) signals from all receiver elements together yields a total signal optimized for that direction or three-dimensional (3D) point. However, the imposing of phase coherence ignores any temporal information carried by the incoming signal.

By contrast, the method according to the first aspect does utilize the temporal information in the signal, thereby establishing a synthetic array that is able to correlate on particular ranges within the target region, while suppressing sources with different pathlengths to a high extent. By using a relatively long and non-repetitive time sequence of noise, and simultaneously moving at least one of the transmitter and the receiver, it becomes possible to obtain strong signal correlation values only for selected ranges. This cannot be achieved with traditional pulsed systems, which repeatedly transmit relatively short and similar signal pulses. The proposed method allows acquisition hardware to remain relatively simple and low-cost, and can be used in a wide range of applications, for instance in acoustic mapping of subsea surfaces, objects, and soil layers, in seismic imaging (i.e. mapping the subsurface of the earth), in seismic cone penetration testing, in detection of unexploded ordinance (UXO), boulders, or buried cables or pipes, in medical acoustic imaging, in radar mapping, or in ground penetration radar (GPR). Note that the terms "map" and "mapping" are used here in a general sense, as referring to a surjective correspondence between an input set (domain) of (mutually adjacent) spatial coordinates and an output set (codomain) of calculated correlation strength values for each such coordinate, yielding a two-dimensional or three-dimensional image.

The time sequence of noise (70) with a predefined bandwidth can be a sequence of PRN values may for instance be a sequence of PRN bits modulated onto the carrier signal using binary phase-shift keying.

In embodiments, the sequence of PRN values in the probing signal is unique and has a total duration at least as long as a total time required by the at least one of the first and second platforms to complete the respective trajectory. In one embodiment, the sequence of PRN values in the probing signal is unique and has the total duration of the method for mapping a target region (60).

By modulating using a PRN code that is as long as possible in comparison to the total duration of the trajectory, the correlation value between the generated test signals and the actually received response signal can be maximized, while false positive correlation contributions from unwanted clutter are maximally suppressed. However, in alternative embodiments, PRN codes with a shorter duration may be used, for instance a PRN code that lasts for only an $N^{th}$ part of the trajectory traversal time (N E N) but which is re-transmitted N times in an consecutive manner, i.e., a pulsed signal with sequential PRN code and that does not repeat itself could be transmitted. In this regard, the sequential PRN code should be continuous, and not necessarily the signal. In this way, pulsed signals could be used as the probing signal, as long as the content of the pulsed signal is pseudorandom and sequential. Then the transmission of the probing signal and the reception of the received signal need to be timed by using an estimate of the local depth. By timing the reception and the transmission the transmitter and receiver could be in the same ASV or platform, without the receiver being disturbed.

In embodiments, the target region is a target area of a submerged surface. In this case, the signal transmitter may be an acoustic transmitter provided on a first waterborne platform, the signal receiver may be an acoustic receiver provided on a second waterborne platform, and the probing signal may be a continuous acoustic signal comprising the sequence of PRN values modulated onto an acoustic carrier signal.

The term "waterborne platform" is used herein to refer broadly to a vehicle or non-propelled body that carries the functional components for executing the mapping method, and which is adapted to be conveyed on/across water. For instance, the first and second platforms may be moved along respective trajectories across a surface of the water and relative to the submerged surface. This submerged surface generally lies at a distance below the water surface and forms an water-soil interface between the body of water above it and the layer of earth below it.

In embodiments, the moving involves moving at least one of the first and second platforms along a corresponding closed curve, while continuously transmitting the probing signal and receiving the response signal over the entire extent of the closed curve. One or both of the closed curves may be a simple closed curve, such as a circular trajectory. For instance, one of the transmitter and receiver may be moving along a circular trajectory around the other one of the transmitter and receiver, whereas this other one is held at an (essentially) stationary position. Alternatively, both the transmitter and the receiver may be co-rotating at different instantaneous locations along circular trajectories around a common centre.

In alternative embodiments, at least one of the first and second platforms may be moving along a linear trajectory. For instance, one of the transmitter and receiver may be moving along a linear trajectory relative to the other one of the transmitter and receiver, whereas this other one is held at an (essentially) stationary position. Alternatively, both the transmitter and the receiver may be moving side by side in essentially linear trajectories, for instance mutually parallel trajectories.

In yet alternative embodiments, both the transmitter and the receiver may be provided on the same vehicle or platform, such that transmitter and receiver are jointly movable along the same trajectory during signal transmission and reception.

According to embodiments, the transforming of the probing signal for each selected portion of the target region includes:

calculating a total delay time based on a propagation speed within the signal carrying medium and on a propagation distance from the instantaneous position of the signal transmitter at the time that the probing signal was transmitted, towards the selected portion where the probing signal was scattered, and further towards the instantaneous position of the signal receiver at the time the response signal was received, and shifting parts or all of the probing signal in time, by correcting for the calculated propagation time, to obtain the test signal associated with the selected portion of the target region.

According to a further embodiment, the transforming of the probing signal includes shifting instantaneous values of the probing signal in time, in such a way that the respective test signal associated with the respective portion of the target region is a sequence of amplitude values defined by $\rho(t_R) = w(t_R - \Delta t)$. Here, $t_R$ represents the time instance at which the receiver receives the response signal. $\Delta t$ represents the total time delay time based on the signal propagation speed in the signal carrying medium and the propagation distance from the instantaneous position of the signal transmitter at the time that the probing signal was transmitted, via the selected portion where the probing signal was scattered, to the instantaneous position of the signal receiver at the time of receipt. Furthermore, $\rho(t_R)$ represents the instantaneous value of test signal $\rho$ at time instant $t_R$, and $w(t_R - \Delta t)$ represents the instantaneous value of the probing signal w at earlier time instant $t_R - \Delta t$.

In an embodiment, the correlating includes calculating, for each selected portion of the target region, a correlation strength between, on the one hand the response signal, and on the other hand the test signal corresponding with the selected portion, in order to determine the map of correlation strengths associated with respective selected portions of the target region.

In a further embodiment, the correlation strength for the respective portion of the target region is calculated using a discrete correlation operation defined by $J(\xi, \eta, \zeta) = \Sigma_t \rho(t) \cdot r(t) = \Sigma_{t_R} w(t_R - \Delta t) \cdot r(t_R)$. Here, J represents the correlation strength value for the portion that is located at a location defined by voxel coordinates $(\xi, \eta, \zeta) \in \mathbb{R}^3$. In addition, $\rho(t)$ represents the test signal $\rho$ as function of time t, whereas r(t) represents the response signal as function of time t. In this case, the method may further include storing the map of calculated values of correlation strength as function of voxel coordinates $(\xi, \eta, \zeta)$ of the respective portions of the target region.

In an embodiment, the method further includes:
 calculating a point spread function (PSF) image for a hypothetical scatter source present only at the selected portion of the target region;
 identifying a location of a true optimum correlation value in the PSF image, and
 identifying a plurality of locations of false excess correlation values in the PSF image.

The set of false excess correlation values identified for a particular PSF image are herein referred to as a "leakage curve".

In a further embodiment, the second platform includes a further signal receiver in proximity of the signal receiver. The further signal receiver is configured to receive a further response signal composed of a plurality of further signal components that result from scattering of the probing signal by distinct portions of the target region, and to cooperate with the signal receiver by dynamically adjusting a phase difference between the response signal and the further response signal received. In this case, the method may further include dynamically adjusting the phase difference as a function of instantaneous position of the second platform relative to the target region, in order to suppress components in the response signal and the further response signal originating from potential scatter sources in a region coinciding with the false positive correlation values in the PSF image.

By adjusting relative phase shifts between similar signals received by multiple closely-spaced receivers in a post-processing stage, it becomes possible to adjust the dual/multi-receiver directivity profile such that certain spatial signal contributions and hence certain contributions to the calculated correlation metric are suppressed (referred to as "nulling"). Methods for creating nulls by adding and phase shifting wave-like signals from multiple receivers per se are considered known, and will not be explained in detail here. Using just two receiver transducers may already suffice, as the signal contribution that needs to be suppressed at any one time during the signal transmission corresponds to a small local patch around a point on the leakage curve of false positive correlation values in the PSF image. If the two receiver transducers are mounted perpendicular to the direction of movement of the second platform, depending on the phase shift between the two transducers, adding both received signals (in post processing after applying the phase shift) will generate nulls in an elevation plane. By dynamically changing the phase shift along the trajectory of the second platform, the null may be dynamically steered to coincide with a location on the leakage curve that is received at that time instance. As the portion of the target region that corresponds to the correct position of the scatter target and that yields the true correlation strength comes from a significantly different direction (e.g. from the centre of the synthetic array), the signal contribution from this portion will be much less suppressed.

In embodiments, the probing signal is defined by $w(t) = A \sin(2\pi\omega t + \delta) S(t)$ in this equation, t represents time, A represents an amplitude of the carrier signal, $\omega$ represents an angular frequency of the carrier signal, $\delta$ represents a fixed phase shift of the carrier signal in a range $0 \leq \delta < 2\pi$, and S(t) represents the sequence of PRN values as function of time. In case the sequence of PRN values is a sequence of PRN bits modulated onto the carrier signal, S(t) may represent a band-pass filtered representation of the PRN bit sequence.

In an embodiment, the signal transmitter is configured to emit the probing signal within a primary emission beam having a substantially uniform spatial gain profile, at least within a solid angle that covers the target area during the emitting of the probing signal.

According to a second aspect of the invention, and in accordance with the advantages and effects described herein above, there is provided a system for mapping a target region of space that comprises a plurality of portions with signal scatterers. The system for mapping the target region is advantageously a system which allows the mapping according to the method of the first aspect of the present invention. Accordingly, advantageously it allows providing a probing signal comprising time sequence of noise with a predefined bandwidth. The system includes a processing device that is configured to:
 acquire a copy of a probing signal from a signal transmitter that has transmitted the probing signal towards the target region, this probing signal including a sequence of PRN values modulated onto a carrier signal;
 acquire a copy of a response signal from a signal receiver that has received the response signal as a composition of a plurality of signal components resulting from scattering of the probing signal by respective ones of the portions of the target region;
 acquire location and timing data from the signal transmitter and/or receiver, this location and timing data representing instantaneous positions of the signal transmitter and/or receiver that have been repeatedly determined during transmitting and receiving, wherein at least one of the signal transmitter and the signal receiver was moving along a respective trajectory relative to the target region while transmitting the probing signal or receiving the response signal, respectively;

transform the copy of the probing signal into a plurality of test signals, each test signal being associated with a signal propagation path via a selected portion of the target region, and to correlate each of the plurality of test signals with the copy of the response signal in the time domain, to calculate a map of correlation strength values associated with respective selected portions of the target region.

The processing device may be mounted on-board one of the platforms that carries the signal transmitter or receiver, on-board a nearby vehicle or vessel, or be part of a remote processing centre or a cloud computing facility.

In an embodiment, the system further includes the signal transmitter and the signal receiver. At least one of the signal transmitter and receiver may then be adapted to be moved along a respective trajectory relative to the target region while transmitting the probing signal or receiving the response signal respectively.

The signal transmitter may be adapted to transmit the probing signal within a predominantly conical intensity distribution that is directed predominantly vertically downwards into a signal carrying medium and towards an expected location of the target region. Alternatively or in addition, the signal receiver may be an omni-directional receiver, adapted to simultaneously receive multiple signal components that are reflected by distinct portions in the target region.

According to a third aspect of the invention, there is provided a computer program product configured to provide instructions to carry out processing steps in a method according to the first aspect, when loaded on a computer arrangement.

According to a fourth aspect of the invention, there is provided a computer readable medium, comprising a computer program product according to the third aspect.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include separate letters appended to the reference number (for instance "72a" and "72b"). The reference number may be used without an appended letter (e.g. "72") to generally refer to an unspecified instance or to all instances of that element.

FIGS. 8a-b schematically show point spread function images for a correlation mapping procedure, as may be used in method embodiments;

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures. Cartesian and spherical coordinates will be used in the next figures to describe spatial relations for the exemplary embodiments. When the term "position" is used herein without modifier, this may refer broadly to linear position (i.e. "location"), to angular position (i.e. "orientation" or "attitude"), or a combination thereof (e.g. to 6DOF position). The specific terms "location" and "orientation" are explicitly used when a distinction is intended. It should be understood that the directional definitions and preferred orientations presented herein merely serve to elucidate geometrical relations for specific embodiments and are not otherwise intended to limit the scope of the invention or claims.

Figure 1:
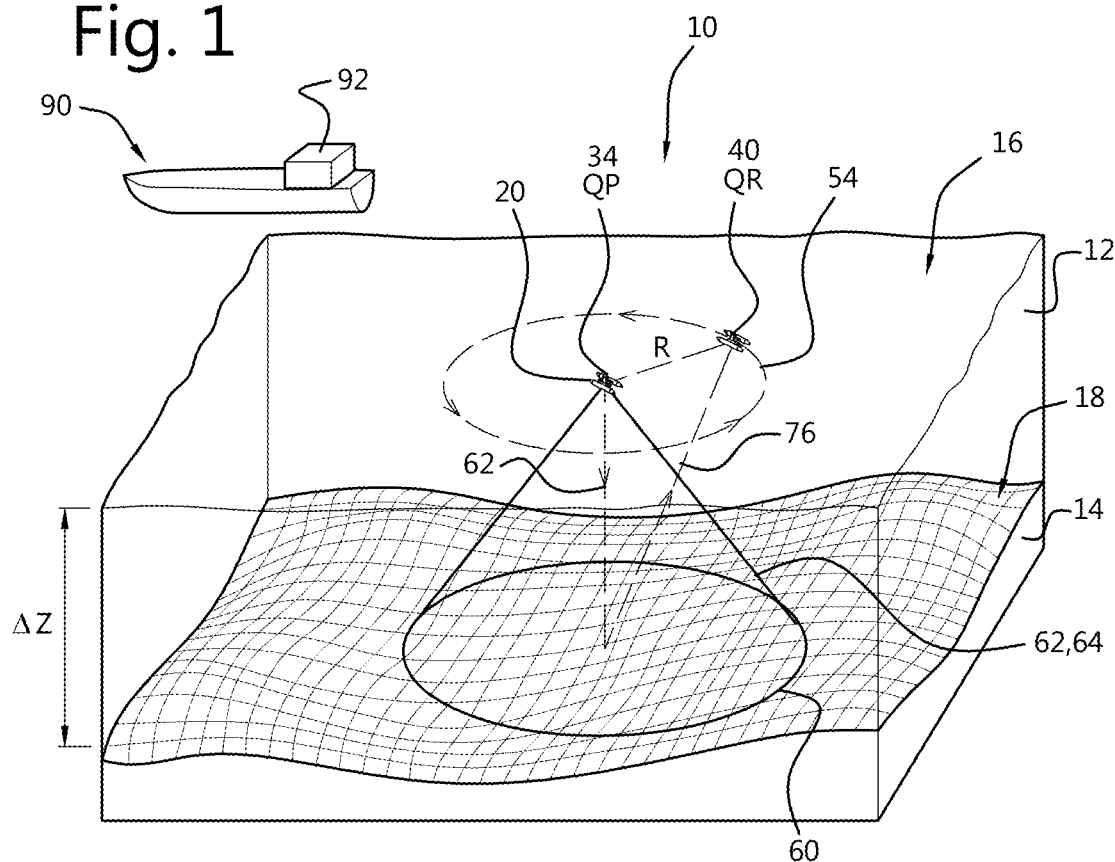
FIG. 1 schematically shows a perspective view of a mapping system, according to an embodiment.

FIG. 1 schematically illustrates a perspective view of a system 10 for mapping a target area 60 of a submerged surface 18. The target area 60 is a relatively large portion of the earth surface 18, which in this example is located below a body of water 12 and forms an interface between this water 12 and a layer of submerged soil 14 below surface 18. This target area 60 may for example be part of an ocean floor 18, and may be located at a depth $\Delta z$ between hundred to several thousands of metres from the water surface 16. The system 10 is configured to be employed for efficient hydrographic mapping purposes, based on emission and reception of acoustic mapping signals 62, 76. Various other survey applications may be considered, such as wreck searching, subsea mining, subsea oil extraction asset monitoring, mine hunting, seismic applications, etc.

This exemplary system 10 comprises a first waterborne platform 20, a second waterborne platform 40, and a vessel 90 with a processing device 92. The first and second platforms 20, 40 are located at or near the water surface 16. At least one of the first and second platforms 20, 40 is moveable across the water surface 18 and relative to the other platform 40, 20, as well as relative to the submerged surface 18. In this example, the first and second platforms 20, 40 are autonomous surface vehicles (ASVs), which are floating, un-crewed, and relatively small. These ASVs 20, 40 are used to image a top layer of the submerged surface 18, with a spatial resolution that is sufficient to observe possible wrecks or other objects on/in this surface 18. Depending on the depth of the surface 18, the spatial resolution of the images may for instance be in a range of 0.1 metres to 10 metres. The ASVs 20, 40 may be remotely controlled, or may be pre-programmed to perform their measurements autonomously.

The first ASV 20 is provided with an acoustic transmitter, and the second ASV 40 is provided with an acoustic receiver. The ASVs 20, 40 are synchronized to a common time-base, for instance at the microsecond level in the present example which relies on transmitting and receiving acoustic signals. The ASVs 20, 40 are configured to determine their instantaneous locations $Q_T$, $Q_R$, and optionally also their orientations (attitude).

During an acquisition survey, at least one of the ASVs 20, 40 travels along a determined trajectory 34, 54 across the surface 18 of the water 12, while the first ASV 20 emits a continuous acoustic probing signal 62 towards a wide target area 60 of the submerged surface 18, and while the second ASV 40 continuously receives a response signal 78 originating from scatter sources located on distinct portions of the submerged surface 18. In this example, the moving ASV (20, 40, or both) traverses a closed trajectory 34, 54 to obtain a sufficiently good geometry and coverage for each location within the target area 60. In this example, the trajectory 34 of the first ASV 20 is predominantly a single stationary location $Q_T$, whereas the second ASV 40 moves along a closed circular trajectory 54 with a large radius R around the first ASV 20.

The separation of the emitter and the receiver on the distinct ASVs 20, 40 allows isotropic transmission and measurement of continuous acoustic signals having relatively large signal powers, while avoiding saturation of the receiver (as opposed to pulsed systems and monostatic systems).

The continuous probing signal 62 includes a long sequence of pseudo random noise (PRN) bits, which are modulated onto an acoustic carrier wave signal (for instance as phase or frequency modulation). If the PRN code does not repeat itself for the duration of the survey, then it may be considered fully (pseudo) random at the time-scale of the entire survey. The relative motion of the ASVs 20, 40 during the transmission and subsequent receipt of the acoustic signals 62, 78 allows the system 10 to act as a synthetic aperture sonar, which relies on high precision positioning to determine the instantaneous positions $Q_R$, $Q_T$ of the ASVs 20, 40 at each instance t. The acquired data may require relatively complex processing steps, but such processing may be executed elsewhere and/or off-line.

Accurate positioning and timing measurements during transmission and reception of the continuous acoustic signals 62, 78 ensure that the response signal 76, which contains reflections from the target area 60 at all times during the survey, can be correlated with the probing signal 62 for selected individual voxels in a three-dimensional volume containing the target area 60, potentially at depths of several kilometres and with a resolution in the order of 0.1 meter to about 20 metres.

In general, post processing of the measurement data may be performed on-board the ASVs 20, 40, or at any other location after all data of the survey has been gathered. In the illustrated example, the data processing may be performed by processor 92 on-board the vessel 90 (which may be nearby or remote). This vessel 90 is provided with a data receiver, configured to communicate with and receive the measurement data from the ASVs 20, 40. In alternative embodiments, the acoustic signals 62, 78 (which may have a relatively low bandwidth) and position and timing measurements may be uploaded via satellite to a remote processing station or to the cloud for automated processing.

Figure 2A:
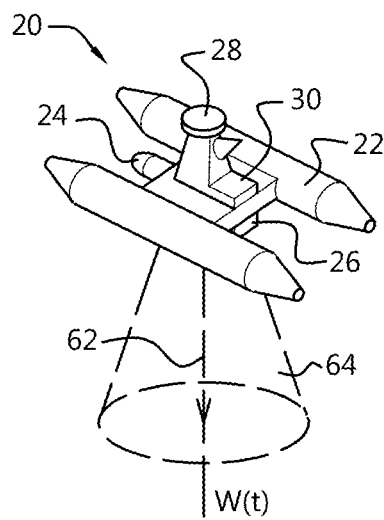
FIGS. 2a-b schematically show perspective views of a transmitter platform and a receiver platform from the system in FIG. 1.
Figure 2B:
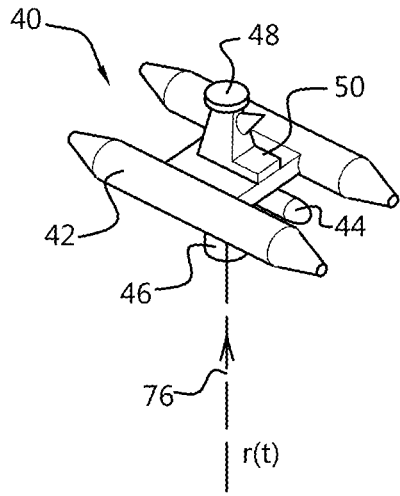

FIGS. 2a and 2b show perspective views of the first and second platforms 20, 40 respectively, used in the exemplary system from FIG. 1. As shown in FIG. 2a, the first platform 20 includes floats 22, a propulsion device 24, an acoustic signal transmitter 26, a first positioning device 28, and a first timer device 30. The transmitter 26 is configured to emit an acoustic probing signal 62 from the first platform 20, into and predominantly downwards through the body of water 12, and towards the target area 60 of the submerged surface 18. This probing signal 62 has a cone-shaped spatial intensity distribution 64. The first positioning device 28 is configured to dynamically/repeatedly determine instantaneous (global) positions $Q_T$ of the first platform 20 and/or of the acoustic transmitter 26 during transmission of the probing signal 62. The first timer device 30 is configured to dynamically/repeatedly sample time values $t_T$ associated with selected instances during transmission of the probing signal 62. In this example, the first platform 20 is not adapted to be moved actively across the water surface 16. The propulsion device 24 serves to maintain the platform 20 at a fixed transverse position relative to the submerged surface 18, by compensating displacements from its initial position due to wave and wind influences.

The acoustic transmitter 26 is adapted to transmit the probing signal 62 in a substantially uniform conical intensity distribution 64 downwards through the water 12 and towards an expected location of the target area 60. Temporal characteristics of this exemplary probing signal 62 will be discussed with reference to FIG. 4.

In the example illustrated in FIG. 2b, the second platform 40 includes second floats 42, a second propulsion device 44, an acoustic receiver 46, a second positioning device 48, and a second timer device 50. The second propulsion device 44 is configured to move the second platform 40 along a predetermined trajectory 54 across the water surface 16, and relative to the first platform 20 and the submerged surface 18.

The acoustic receiver 46 is configured to receive the acoustic response signal 76, which is composed of (among other things) acoustic signal components that are scattered by distinct portions of the submerged surface 18 within the target area 60. The second positioning device 48 is configured to dynamically/repeatedly determine instantaneous (global) positions $Q_R$ of the second platform 40 and/or its acoustic receiver 46 during receipt of the response signal 76. The second timer device 50 is configured to dynamically/repeatedly sample time values $t_R$ associated with selected instances during reception of the response signal 76. The timer devices 30, 50 are time-synchronized to a common time base, with an accuracy in the order of microseconds or less.

In this example, the acoustic receiver 46 is an omnidirectional receiver, adapted to receive the acoustic response signal 76, which is composed of multiple signal components from multiple scattering sources located across the submerged surface 18. This receiver 46 is configured to detect and sample both the amplitude and the phase of the response signal 76. The second platform 40 is configured to continuously collect the response signal 78 while moving along its trajectory 54 around the first platform 20.

Each of the first and second platforms 20, 40 receives GNSS signals from a GNS system (e.g. Global Positioning System satellites), to allow each platform 20, 40 to determine accurate positioning information. The positioning devices 28, 48 may be GNSS positioning devices that include both real-time kinematic (RTK) data relative to the receiver, and precise point positioning data based on GPS and GLONASS orbit and clock corrections (G2). Each of the positioning devices 28, 48 may also include an inertial measurement unit (IMU) for determining an indication of pitch, yaw, and roll.

Each of the first and second platforms 20, 40 may further include a communication system, which is configured to report platform status, to allow receiving external control commands, and to transmit acquired measurement data to the external vessel 90 or station.

The processing device 92 is configured to collect the probing signal 62, the response signal 76, the sets of position measurements and timing measurements from the first and second platforms 20, 40, and to process these to determine a correlation metric 80. This correlation metric 80 will be used to construct a map 84 of the target area 60 of the submerged surface 18, as will be explained below with reference to FIGS. 3-8.

In the example of FIG. 1, the second vehicle 40 is configured to move along a circular trajectory 54 around the first platform 20. In other embodiments, the propulsion device 24 of the first platform 20 may be configured to move this platform 20 along its own trajectory relative to the second platform 40 and the submerged surface 18. For example, the platforms 20, 40 may move side-by-side along parallel linear trajectories with respect to the water surface 16, and at a non-zero separation distance that is (quasi) constant.

Figure 3:
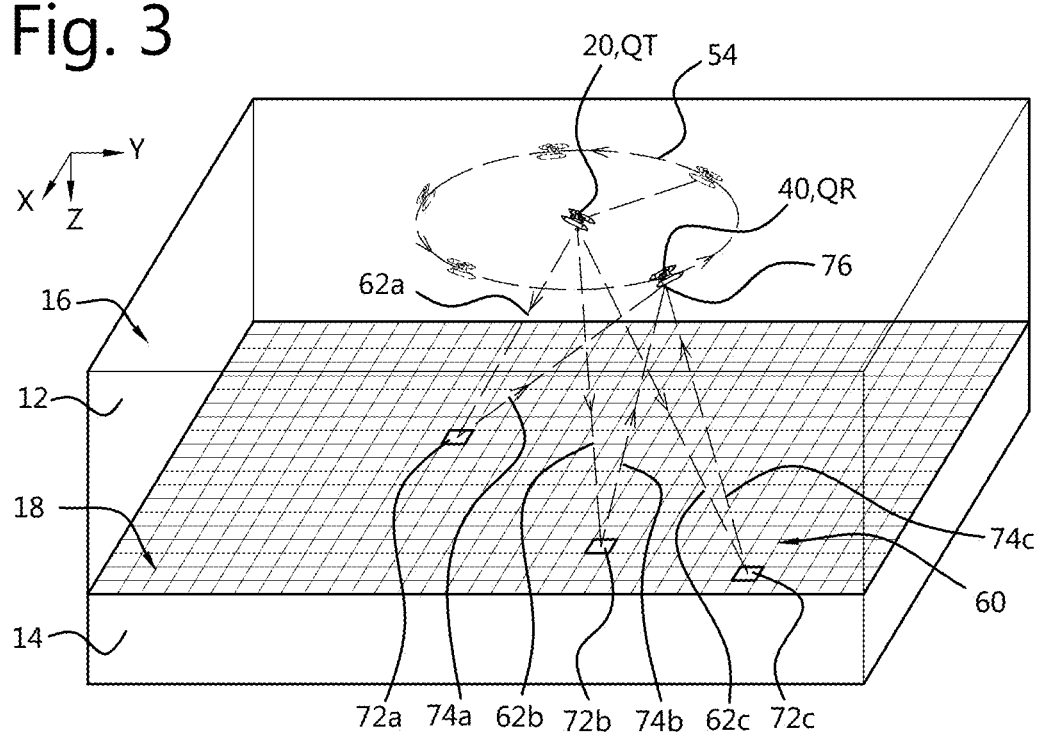
FIG. 3 schematically illustrates signal paths in a mapping method, according to an embodiment.

FIG. 3 schematically illustrates three examples of various signal propagation paths 62, 74 during execution of the method in FIG. 1. Mapping of the target area 60 is achieved through transmission and reception of continuous acoustic signal fields 62, 74, which include determined temporal patterns that allow matching of the signals via correlation methods.

The probing signal 62 transmitted by the first platform 20 propagates via different paths 82a, 62b, 62c towards the submerged surface 18, where these signal portions 62 impinge on distinct portions 72a, 72b, 72c of the surface 15. These signal portions 62 are randomly scattered in all directions due to the irregular structure of the surface 15. The resulting scattered signal components 74a, 74b, 74c travel along distinct paths back towards the water surface 16. Some of these scattered components 74 are then picked up by the receiver 46 at the second ASV 40. The actual response signal 78 received by the receiver 46 will be composed of a large number of such components 74, though, and these components 74 are difficult to distinguish.

In this example, the first ASV 20 remains (quasi) stationary at position $Q_T$, while transmitting the probing signal 62 towards the target area 60. During this transmission, the first ASV 20 records transmission times $t_T$ corresponding with specific amplitude instances $w(t_T)$ of the probing signal 62, and also repeatedly determines its instantaneous location $Q_T$ to verify whether the assumption of stationarity is still complied with, or whether positional correction is needed. The ASV 20 may temporarily store this time and location data for future processing or for transmission to a remote processing device 92.

Meanwhile, the second ASV 40 moves along various second locations OR of its circular trajectory 54, while continuously receiving the resulting response signal 78 from the various portions 72 of the submerged surface 15. During this reception, the second ASV 40 records reception times $t_R$ corresponding with specific amplitude instances $r(t_R)$ of the response signal 76, and also repeatedly determines is instantaneous location $Q_R$. This time and position data may be temporarily stored by the second ASV 40, or transmitted to the processing device 92.

Figure 4:
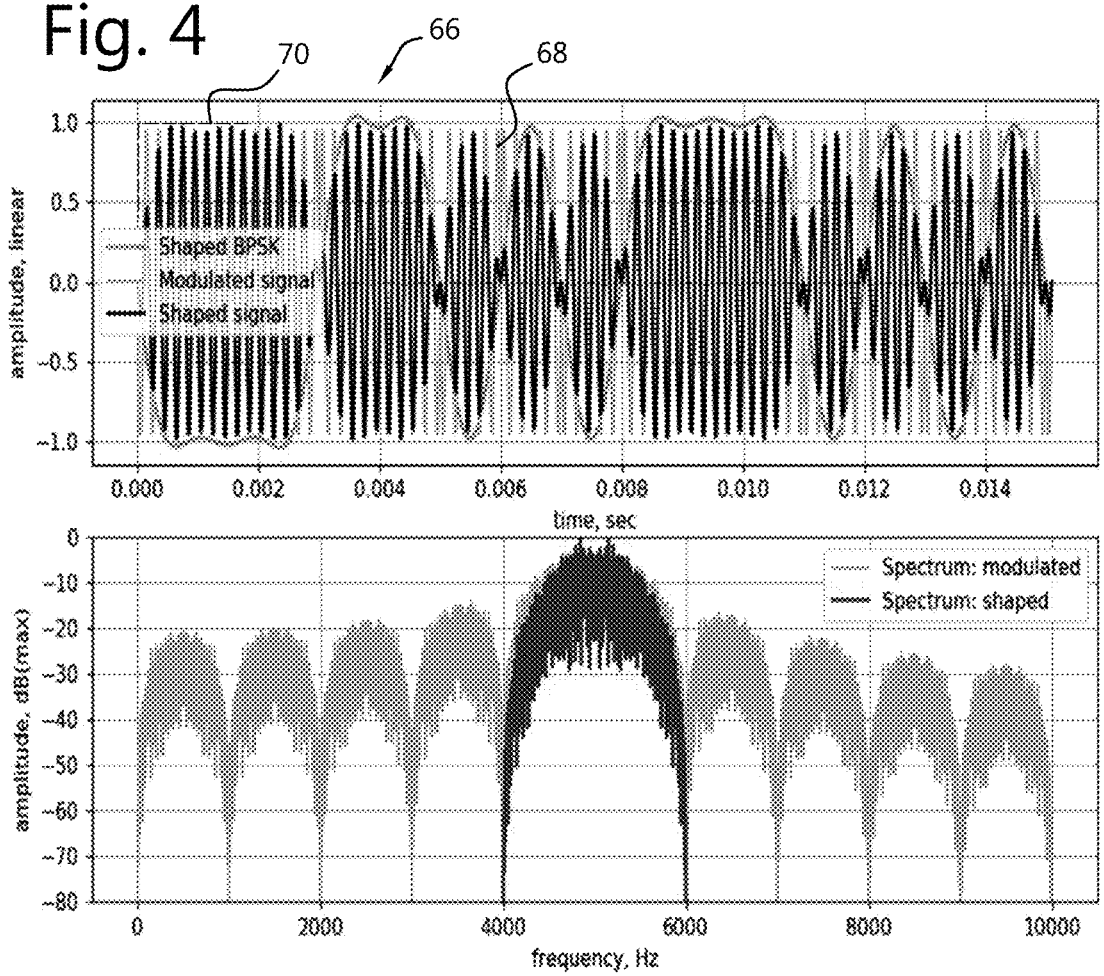
FIG. 4 shows part of an acoustic probing signal that may be used in a method embodiment.

FIG. 4 illustrates temporal characteristics 66 of an exemplary probing signal 62 that may be used in the proposed method. In this example, the probing signal 62 involves binary phase shift keying (BPSK), based on pseudo-random code (PRC) phase modulation 70 of a continuous wave carrier signal 88 with a fixed frequency. In this example, the binary code sequence is low-pass filtered to obtain a limited bandwidth for the resulting probing signal 62. The amplitude of the probing signal 62 in the time domain may be described by the following function:

$$w(t) = A \sin(2\pi\omega t + \delta) S(t) \qquad \text{(eq.1)}$$

Here, S(t) is a band-pass filtered version of the binary pseudo-random code 70, A is an initial amplitude of the probing signal 62, and w is the frequency of the carrier wave 68. FIG. 4 shows only a portion of such a probing signal 62. The choice for carrier frequency ω depends on the predicted attenuation of the signal through the water column 12, and the predicted signal absorption, penetration, and scattering characteristics by the submerged surface 15. The accumulated phase uncertainty is the sum of unaccounted phase effects in the water column 12 and at the scattering source as a result of (un-modelled) frequency dependent penetration. The chosen frequency bandwidth of the modulation determines an achievable resolution of the image of the submerged surface 15. In turn, a minimum total number of bits required to obtain an image of sufficient quality depends on the chosen modulation bandwidth.

Data processing in the exemplary method is based on predicting the phase of a signal that the receiver 46 is expected to receive from a scatter source that is presumed to be present at a particular location at the submerged surface 18, and correlating this predicted signal with the actually received response signal 78 for the duration of the survey. If the putative scatter source is indeed present at that location, and if the prediction is correct, then the correlation operation is expected to yield a relatively high correlation metric value J. The magnitude of this correlation metric value J is expected to contain a large portion of the scatter strength of the putative scatter source, as well as (random) components from other scatter sources. The considerable length of the PRN-coded probing signal 62 will help suppress signal contributions from other scatter sources in the target area 60, as these other sources correspond to different pathlengths, which are expected to change continuously throughout the duration of the survey.

Suppose a portion 72a of a submerged surface 18 around the position (0, 0, z) is to be imaged. The first platform 20 with transmitter 26 moves along a determined trajectory 34 while continuously emitting the probing signal 62 of the form w(t) in equation (1). In the example of FIGS. 1 and 3, the transmitter 26 is chosen to be located at position $Q_T$=(0, 0, $z_{surface}$=0) and remains static throughout the survey, to simplify calculations. This is, however, not necessary.

The second platform 40 with receiver 46 moves along a determined trajectory 54 around the transmitter 26, while receiving return fractions 74 of the probing signal 62 that were scattered by distinct portions 72 of the submerged surface 18. During the survey of a duration T seconds, the system 10 sends and receives a known pseudo-random bit sequence 70 with a length $N_b$ of bits. The duration T of the survey may for instance be approximately 7000 seconds, and the total number of bits $N_b$ in the sequence may be approximately 7×10⁶.

Consider a particular three-dimensional point $P_k$=(ξ, η, ζ)∈ $\mathbb{R}^3$ within the field of view of transmit-receive system 10. Assume that a scatter source present in point $P_k$ reflects a portion of the probing signal 62 forward to the receiver 46 without changing the form of the signal, and assuming that the transmitter 26 and the receiver 46 remain stationary. One then expects to receive a delayed version of the time representation w(t) of the probing signal 62. If one of the platforms 20, 40 moves, then the signal traveling from the transmitter 26, via sample point $P_k$ at area portion, to the receiver 46, experiences a propagation delay Δt that is proportional to the length of the path $Q_T \to P_k \to Q_R$ from the transmitter 26, to the point $P_k$, to the receiver 46. If the transmitter 26 and receiver 46 are kept stationary, then this pathlength remains constant, but if one or both of the transmitter 26 and receiver 46 move, then the pathlength and corresponding propagation delay $\Delta t$ change continuously.

The time representation w(t) of the probing signal 62 contains a known non-repeating PRN coding sequence 70. This coding sequence 70 is known in advance at both the transmitter 28 and the receiver 46. The received sequence of bits depends on the travel path, and is entirely predictable (within the accuracy with which the sound velocity and trajectories of the platforms 20, 40 are known) for each point $P_k$ in the subspace being imaged. The sequence is not unique for each point $P_k$ in the subspace, as will be discussed in more detail below.

When at least one of the platforms 20, 40 moves, the propagation pathlength will change continuously in time, which will cause the distinct coding bits in the probing sequence 70 of w(t) to experience different delays, depending on the coordinates of the imaged point $P_k$.

The image value for a point $P_k$ may be calculated by a correlation operation J between, on the one hand the actually received bit sequence in the received signal 76, and on the other hand a test signal pattern $\rho(t)$ based on the bit sequence 70 in the probing signal 62 that is predicted to be received after traversing the path $Q_T \to P_k \to Q_R$. This correlation may be expressed as $$J(\xi, \eta, \zeta) = \hat{R} \otimes R = \sum_{i=0}^{N_b} \rho_i \cdot r_i \qquad (eq.2)$$

wherein $R=\{r_i\}_0^{N_b}$ represents the actually received bit sequence, $\hat{R}=\{\rho_i\}0^{N_b}$ represents the predicted bit sequence, and $\otimes$ represents a dot product.

If a scatter source is present at point $P_k$, the operation defined by (eq. 2) will return a value close to $N_b c_p$, with $c_p$ being a characteristic reflectivity of this scatter source. If no scatter source is present at $P_k$, then the operation (eq. 2) returns a lower value that approaches $\sqrt{N_b}$.

The exemplary imaging algorithm may be formally summarized by Table 1 below:

1. For all moments of time $t_T$ and points $Q_T(t_T)$ on the transmitter trajectory:
2.    for all selected points $P_k = (\xi, \eta, \zeta)$ in the imaged subspace $\Omega \subset \mathbb{R}^3$:
3.       for all moments of time $t_R$ on the reception side, build the test pattern $\rho(t)$ by:
         a. computing the time $t_R$ at which the instantaneous value for the probing signal transmitted at time $t_T$, which is expected to be scattered by a putative scatter source present at point $P_k$ after a first propagation delay $\Delta t_\downarrow$, will reach the receiver at the position $Q_R(t_R)$ after a further delay $\Delta t_\uparrow$, via
           $t_R = t_T + \Delta t_\downarrow + \Delta t_\uparrow$
         b. assigning the amplitude of the probing signal w at time $t_T$ to the instantaneous amplitude $\rho(t_R)$ of the test pattern at time $t_R$:
           $\rho(t_R) = w(t_T)$
4. calculate a correlation strength value $J_k$ for that point $P_k$, by projecting the resulting pattern $\rho(t)$ for that point $P_k$ as function of t onto the response signal r(t) that was actually received by the receiver:

$$\mathcal{J}(\xi, \eta, \zeta) = \sum_t \rho(t) \cdot r(t)$$

The reception time $t_R$ for an (instantaneous) portion of the scattered probing signal depends on: the transmission time $t_T$, the position $Q_T$ of the transmitter 26 at time $t_T$, the position of the receiver 46 at time $t_R$, the position $P_k=(\xi, \eta, \zeta)$ of the selected voxel for which the correlation strength J is calculated, and the velocity $v_s$ of sound in the water 12. The latter typically varies as a function of vertical distance z i.e. $v_s=v_s(z)$. Combining these contributions yields:

$$t_R = t_T + \Delta t_\downarrow + \Delta t_\uparrow = t_T + \frac{1}{v_s}\|Q_T(t_T) - P_k\| + \frac{1}{v_s}\|Q_R(t_R) - P_k\| \qquad (eq.3)$$

Moving known quantities in the above equation to the right yields:

$$v_s t_R - \|Q_R(t_R) - P_k\| = v_s t_T + \|Q_T(t_T) - P_k\| \quad (eq.\ 4) \qquad (eq.4)$$

Expanding vector components yields:

$$v_s t_R - \sqrt{(Q_{Rx}(t_R) - \xi)^2 + (Q_{Ry}(t_R) - \eta)^2 + (Q_{Rz}(t_R) - \zeta)^2} = B \qquad (eq.5)$$

wherein B has been defined by $$B \equiv v_s t_T + \|Q_T(t_T) - P_k\| \qquad (eq.6)$$

The quantity B above is a known constant for a transmitter 26 located at a position $Q_T$ that remains stationary for all times $t_T$. Advantageously, for a moving transmitter the quantity B becomes time dependent, but remains a known at each moment in time. For generic trajectories of the receiver 46, equation (eq. 5) needs to be numerically solved for each moment of time $t_R$ that the receiver 46 receives an instantaneous portion of the response signal 76.

Consider a single instantaneous value of probing signal (also called bit) being part of the transmitted probing signal 88, which is sent out by the transmitter 26 at location $Q_T$ and at time instance $t_T$. This value will arrive at the scatter location $P_k$ at time $t_P$, and (after being scattered) subsequently arrives at the receiver 46 at location $Q_R$ and at time $t_R$. The arrival times are defined by:

$$t_P = t_T + \Delta t_\downarrow = t_T + \frac{1}{v_s}\|Q_T(t_T) - P_k\| \qquad (eq.7)$$

$$t_R = t_P + \Delta t_\uparrow = t_P + \frac{1}{v_s}\|P_k - Q_R(t_P + \Delta t_\uparrow)\| \qquad (eq.8)$$

Eq. (7) describes a formulaic dependency, whereas eq. (8) contains the unknown and changing travel time $\Delta t_\uparrow$ on both sides of the equation, rendering eq. (8) a non-linear equation that may need to be solved for every sample of the signal at the reception side when both platforms are continuously moving.

The following algorithm may be used to obtain a predicted test signal $\rho(t)$. This algorithm relies on the introduction of a virtual transmitter/receiver-pair at the point $P_k$ being imaged. Consider a virtual receiver $V_x$ placed at point $P_k$ and construct a function $$\Delta_\downarrow(t; P_k) \equiv \frac{1}{v_s}\|Q_T(t) - P_k\|,$$

representing the delays each instantaneous value of the transmitted signal w(t) undergoes before arriving at $P_k$. Then the message b(t) received by this virtual receiver $V_x$ may be described by $$b(t) = \tilde{w}(t - \Delta_\downarrow(t)), 0 \le t \le T_V \quad \text{(eq.9)}$$

Here, $\tilde{w}$ represents a zero-padded version of the transmitted signal w(t), and $T_v$ is a duration T of the message plus some arbitrary extra listening time interval.

Construct a function $$\Delta_\uparrow(t; P_k) \equiv \frac{1}{v_s}\|Q_R(t) - P_k\|,$$

representing the delays each instantaneous value of b(t) undergoes starting at static $P_k$ before arriving at moving $Q_R$. Now allow the virtual receiver to re-transmit the message b(t) It has received at $V_x$, such that the broadcast from $V_x$ is subsequently received as the response signal r(t) by the receiver 46 at location $Q_R$ $$r(t) = \tilde{b}(t - \Delta_\uparrow(t)), 0 \le t \le T_R \quad \text{(eq.10)}$$

Here, $\tilde{b}$ represents a zero-padded version of the signal b(t) broadcast by the virtual transmitter $V_x$, and $T_R$ represents the duration $T_v$ of the virtual broadcast plus some arbitrary extra listening time interval.

Platform 20 with transmitter 26 and platform 40 with receiver 46 are both assumed to be moving. In practice, measurements of the instantaneous locations $Q_T$ and $Q_R$ for the traveling platforms 20, 40 take place repetitively, yielding ordered time-stamped lists of coordinates:

$$Q_T = \{(t_T, x_T, y_T, z_T)\}_{T=0}^{T=M_T}, Q_R = \{(t_R, x_R, y_R, z_R)\}_{R=0}^{R=M_R} \quad \text{(eq.11)}$$

The time stamps in eq. (11) are not necessarily coinciding and their lengths may be different ($M_T \ne M_R$), but these time stamps nevertheless comply with $t_{T_0} \le t_{R_0}$ and $t_{T_{max}} < t_{R_{max}}$.

In the present algorithm, the following two linear interpolators are first defined:

$$I_{T_x}(t_T; (x_T, y_T, z_T)) \quad \text{(eq.12)}$$

$$I_{R_x}(t_R; (x_R, y_R, z_R)) \quad \text{(eq.13)}$$

Here, the interpolator function $I_{T_x}$ represents a coordinate vector expression, with an x-component defined by the linear equation $x = x_T + (t - t_T) \cdot (x_{T+1} - x_T)/(t_{T+1} - t_T)$, and with y- and z-components involving similar expressions based on $y_T$ and $z_T$, respectively. The interpolator function $I_{R_x}$ involves similar expressions for receiver coordinates $x_R$, $y_R$, and $z_R$.

Consider a signal transmission of duration $T_D$ sampled at a sufficient rate, $w = \{w(t_i)\}_{i=0}^{N_T}$, where $t_{N_T} = T_D$. Construct a zero-padded linear interpolator $I_w$ for this sampled transmission:

$$I_w(t_i; w_i): [0, T_D] \to (-\infty, \infty), \text{ such that } I_w(\tau) = 0 \text{ if } \tau \notin [0, T_D] \quad \text{(eq.14)}$$

Consider a virtual broadcaster located at the point $P_k$. Introduce a sufficiently finely sampled time base $\{t_j\}_{j=0}^{N_B}$ for a signal that would be received at point $P_k$ if sent from a moving platform $T_x$. This signal b can be approximated using linear interpolator $I_w$ via:

$$b_j = I_w\left(t_j - \frac{1}{v_s}\|I_{T_x}(t_j) - P_k\|\right), 0 \le j \le N_B \quad \text{(eq.15)}$$

A further zero-padded linear interpolator $I_b$ may be introduced for this broadcast:

$$I_b(t_j; b_j): [0, T_B] \to (-\infty, \infty), \text{ such that } I_b(\tau) = 0 \text{ if } \tau \notin [0, T_B] \quad \text{(eq.16)}$$

Finally, a finely sampled time base $\{t_r\}_{r=0}^{N_R}$ is introduced for a predicted signal $\rho_r$ that would be received at the receiver $R_x$. This predicted signal is computed via:

$$\rho_r = I_b\left(t_r - \frac{1}{v_s}\|I_{R_x}(t_R) - P_k\|\right), 0 \le r \le N_R \quad \text{(eq.17)}$$

Figure 5A:
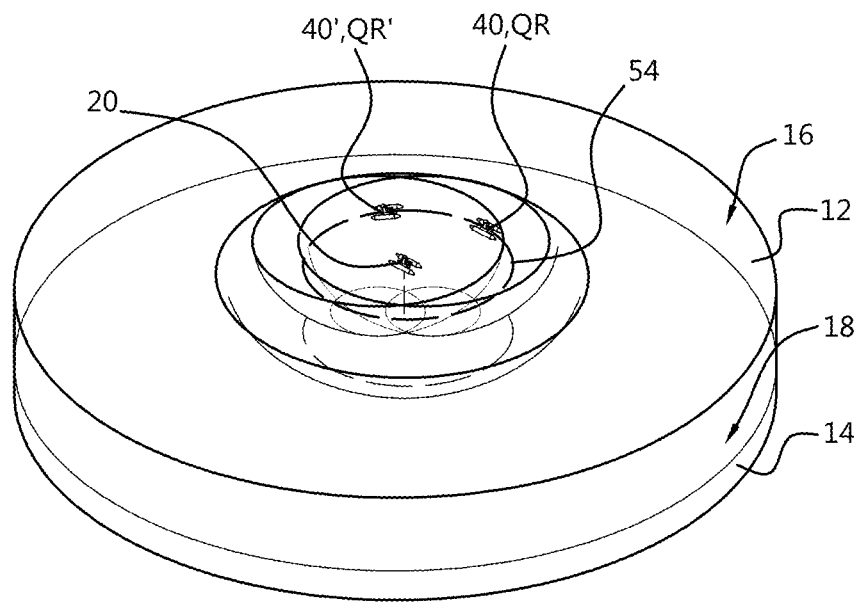
FIGS. 5a-b schematically show platform trajectories and ambiguity ellipsoids associated with the method in FIG. 3.
Figure 5B:
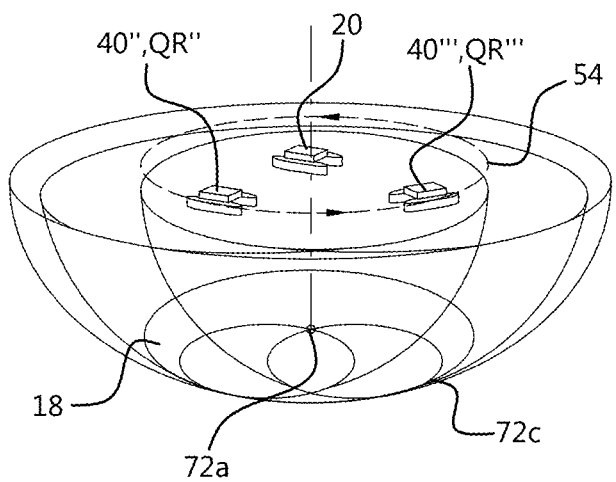
Figure 6A:
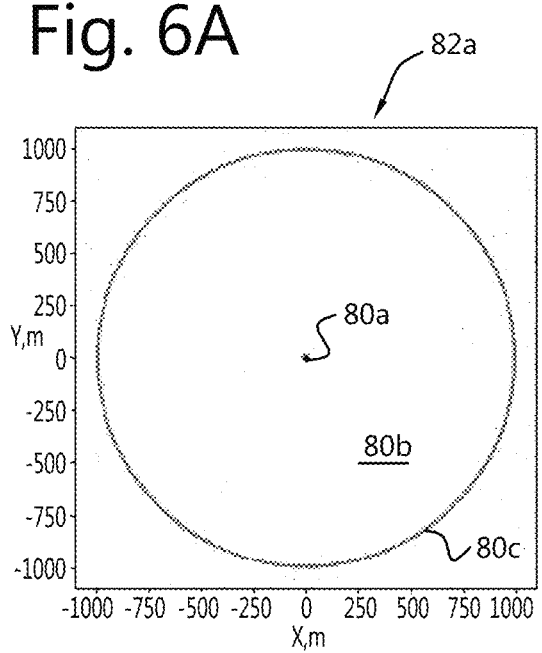
Figure 6B:
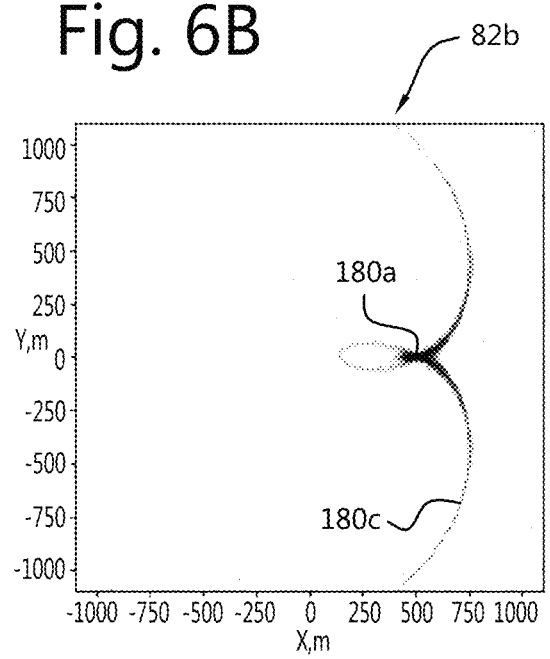

The proposed algorithm involves repeatedly calculating the nested interpolation operations in eq. (12) through (17) for each time sample t, FIGS. 5*a* and 5*b* schematically illustrate nominal range ambiguity ellipsoids that arise in the exemplary method of FIGS. 1-3. Each range ellipsoid is associated with a particular constellation of the transmitter 26 at location $Q_T$ (which in this case is quasi-stationary) and the receiver 46 at location $Q_R$ (which in this case moves along circular trajectory 54). More specifically, it spans a hemi-surface formed by all points below the water 12 that have an identical pathlength from $Q_T$ via this hemi-surface back to $Q_R$. Figure 5a shows two distinct locations $Q_R$, $Q_R'$ for the second ASV 40, and FIG. 5*b* shows two further locations $Q_R''$, $Q_R'''$. Each such range ellipsoid intersects the submerged surface 18 along an (approximately) elliptic curve. This curve represents a set of surface portions 72 in which scatter sources may be present that have identical pathlengths, and thus cannot be distinguished from each other by the correlation operation J defined in (eq. 2).

In the method in FIGS. 5*a-b*, the bi-static constellation of transmitter 26 and receiver 46 is continuously changing during the survey, but the start and end points of the receiver's trajectory 54 coincide. By integrating correlation value J (for a particular surface portion 72) based on a continuous probing signal 62 with a PRN-modulation 70 that perpetuates while the position $Q_R$ changes, signals 74 from surface portions 72 that are covered multiple times from different angles while position $Q_R$ changes are expected to decorrelate, such that the associated range ambiguities are suppressed or eliminated. After this trajectory-based correlation, a strong correlation value for central portion 72*a* remains, surrounded by a simple closed curve of correlation values from surface portions 72*c* that have been only covered once during the trajectory-based correlation operation. In FIG. 5*b*, this leakage curve is depicted by the circumscribed circular curve spanned by the radially outermost points where each of the ambiguity ellipsoids intersects with the submerged surface 18.

The point spread function (PSF) for the presented surface mapping algorithm describes the image corresponding to a perfect point scatter source. For a transmitter 26 that is assumed stationary at $Q_T=(0, 0, z_{surface}=0)$ and a receiver 46 that travels along a circular trajectory 54 described by $Q_R(t)=(R·\cos(\varphi t), R·\sin(\varphi t), z_{surface}=0)$ around the transmitter 26, one arrives at a circular synthetic aperture model. Here, R represents the radius and p the polar angle of the circular trajectory 54.

An experimentally determined PSF image 82a for such configuration with R=1000 metres and a 100 kbit probing message transmitted at 1 kHz bitrate is shown in FIG. 8a. This image 82a illustrates that the PSF for this method is not shift-invariant. The image 82a includes a high correlation strength 80a in the centre, corresponding to the correct position of the scatter target at 0 dB(max), a smooth bright circular curve composed of points with moderately high correlation strength values 80c at −30 dB(max), and a noise floor formed by points 80b with low correlation strength values at approximately −50 dB(max).

The leakage curve of ambiguity points 80c, which is circular in case the scatter source is assumed to be located at the centre voxel $P_k=(0, 0, \zeta)$ as shown in FIG. 8a, constitutes an artefact of the imaging method. FIG. 8b illustrates another PSF image 82b, in which the putative scatter source with high correlation strength 180a is located at a distance from the centre and to the right towards the trajectory of the receiver, causing the leakage curve 180c to change into a cycloid that exhibits a double loop and self-intersects at maximum 180a. For off-centre voxels $P_k= (\xi \ne 0, \eta \ne 0, \zeta)$ the iso-pathlenght ellipsoids are no longer symmetrical about the image centre, even for a circular receiver trajectory 54. As a result, the enveloping outer curve resulting from the correlation strength calculations $J_k$ will tend to deviate from a symmetrical shape (see FIG. 7 for another example).

Consider the first platform 20 with transmitter 26 and second platform 40 with receiver 46, with each platform traversing its own closed loop trajectory 34, 54. Consider a point $P_k=(x, y, z)$ for which an image is being computed. A signal transmitted at any moment of time $t_T$ traverses the path $Q_T(t_T) \to P_k \to Q_R(t_R)$ in the time $\Delta t_f = \Delta t_\downarrow + \Delta t_\uparrow$, so $t_R=t_T+\Delta t_f$. From geometrical considerations, it follows that $P_k \in Q=\{q \in \mathbb{R}^3 | t(Q_T \to q \to Q_R)=\Delta t_f\}$. Q is called the locus of points for which the time of flight $\Delta t_f$ is the same. Intersection of this 3D surface with the plane $\zeta=z$ gives an ellipse-like 2D curve, designated as $F_T$. Consider the moment of time $t_T+\Delta t$, where $\Delta t$ is the time resolution available for the system. Consider the same ellipse-like curve as before, computed for this moment of time. This curve $F_{T+\Delta t}$ will intersect $F_T$ in two points: P=(x, y, z) or the point being imaged, and a further point $\overline{P}$ that is designated herein as the "ghost point". The leakage curve is formed by the union of the ghost points 180c. To obtain the leakage curve for given trajectories of the transmitter 26 and the receiver 46 and the point $P_k$ being imaged is therefore tantamount to computing the locations of the second intersection points.

Figure 7:
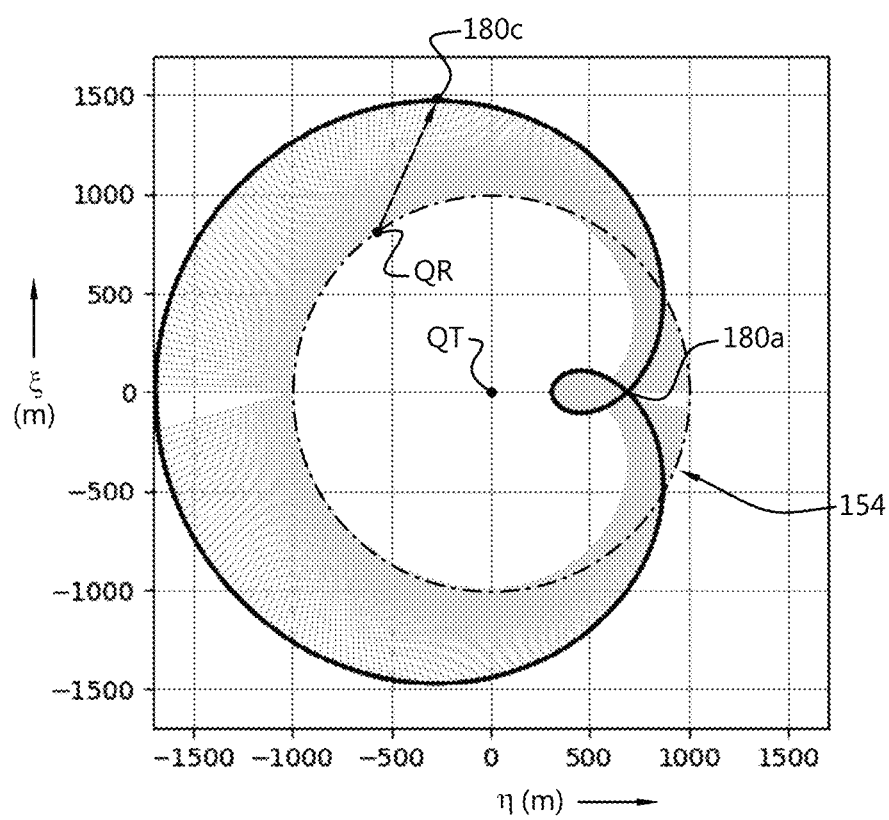
FIG. 7 shows a predicted point spread function for an off-centre element of the target region and a receiver traversing a circular trajectory according to an embodiment.

FIG. 7 shows an example of a computation for a stationary first platform 20 with transmitter 26 located at $Q_T \equiv (0, 0, z_{surface}=0)$, and second platform 40 with receiver 46 moving in a circular trajectory 154 around it. The trajectories for platforms 20 and 40 may in general be more complex, leading to more complex leakage curves.

The method may be enhanced by increasing the correlation sensitivity for a potential scatter source at the central surface portion 72a, based on suppression of the ambiguity using steerable nulling of received response signals. For this purpose, the second ASV 40 may include at least one further acoustic receiver 47, which is configured to receive a further response signal 77 (see FIG. 2b). Similar as signal 76, the further signal 77 is composed of a plurality of further signal components resulting from scattering of the probing signal 62 by distinct portions 72 of the target area 60. The receivers 46, 47 are configured to cooperate and allow dynamical adjustment of a phase difference E between the received response signals 76, 77. The method may then further involve dynamical adjustment of the inter-signal phase difference ε as a function of measured instantaneous position $Q_R$ of the second platform 40 relative to the target area 60, in order to create destructive interference between these signals 76, 77 from desired directions. In particular, the steerable nulling may be used to suppress components in the response signals 76, 77 that originate from potential scatter sources in points $P_k$ of the target area 60 that coincide with the false positive correlation values 180c in the PSF image (e.g. 82a or 82b in FIGS. 8a-b).

Figure 8:
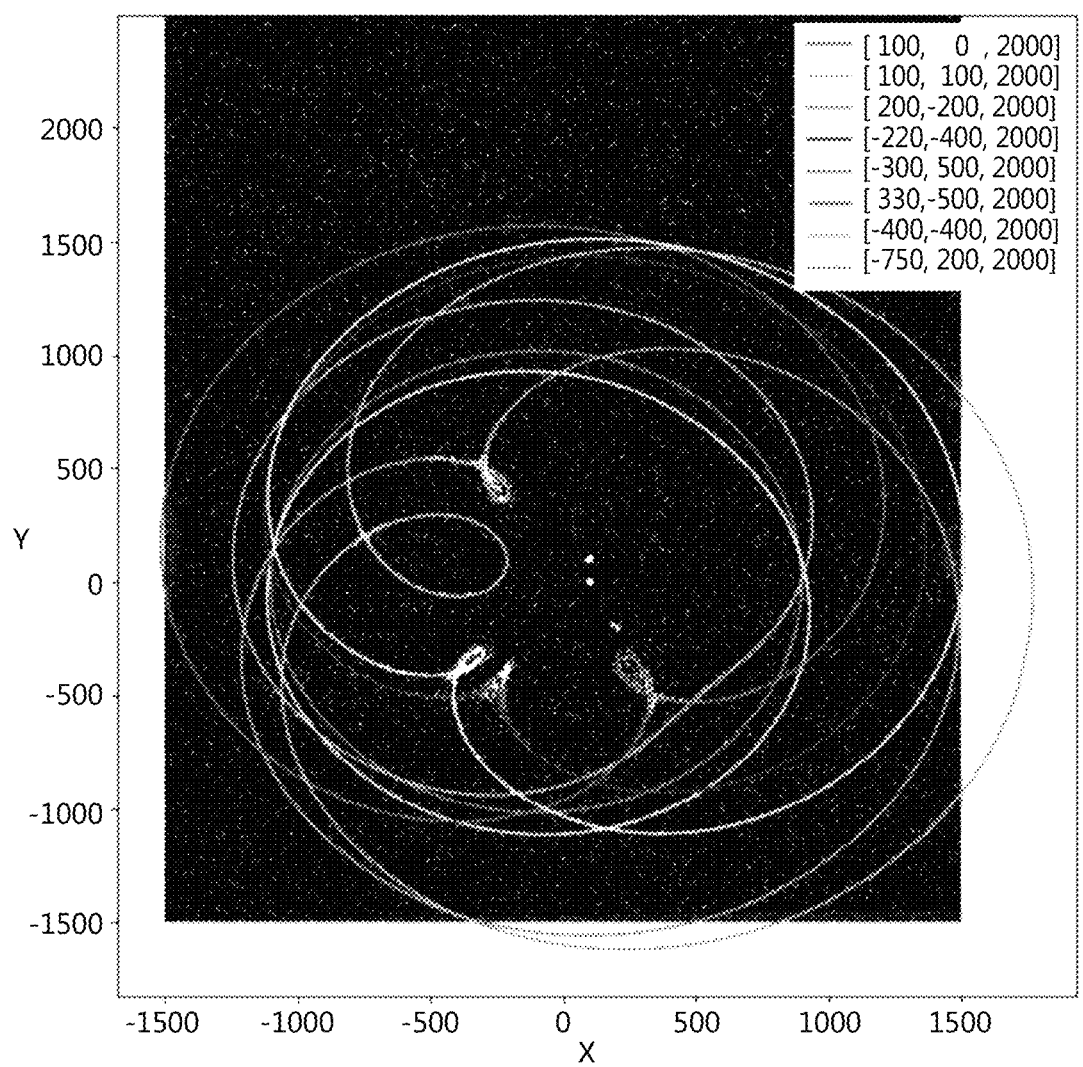
FIG. 8 shows an example of a correlation map obtained using an embodiment of the method.

FIG. 8 shows an example of a two-dimensional correlation map or image 84 obtained by an embodiment of the proposed method. In this example, eight acoustic scattering sources were present at known transverse locations and depths relative to a seabed, as well as relative to an acoustic transmitter that remained approximately stationary at (0,0,0) while an acoustic receiver circled around the transmitter and emitted a PRN-modulated acoustic signal. Leakage lines for individual scatter points were predicted by means of PSF-analysis described above, and the resulting PSF-plots (sold curves in FIG. 8) were compared to the map 84 of calculated correlations between on the one hand predicted test signals for putative scatterers present within the plane at the expected depth and on the other hand the received response signal from the scattering sources (2D image of intensity values in FIG. 8). This shows that predicted and observed leakage lines coincide to a significant extent.

The present invention may be embodied in other specific forms. The described embodiments are to be considered in all respects only as illustrative and not restrictive. The scope of the invention Is, therefore, indicated by the appended claims rather than by the foregoing description. It will be apparent to the person skilled in the art that alternative embodiments of the invention can be conceived and reduced to practice. All changes which come within the meaning and range of equivalency of the claims are to be embraced within their scope, to the extent permitted by national law.

The example of FIG. 1 included a vessel 90, but this is not necessary. In other embodiments, drones (e.g. ASV's) may be launched and recovered from shore, and acquired signal data may be uploaded (e.g. via satellite) or otherwise transferred (e.g. via hard disk) to a remote station or cloud computing environment for calculating signal correlations and executing further imaging/processing steps. In yet other embodiments including drones with sufficient processing capability, the correlation and further image processing may be executed on-board one or more of the drones.

In the example, the emitter 28 and receiver 46 were located on distinct ASVs 20, 40, but this is not essential. In alternative embodiments, both transmitter and receiver may be provided on the same vehicle or platform, provided the receiver is designed so as not to saturate by the transmitter signal, for instance by adequate signal isolation and/or a very high dynamic range of the receiver. In another embodiment using a single vessel, the transmitter will interrupt the transmission of the continuous probing signal during certain periods of time and those periods of time will be used by the receiver to receive the response signal.

In a further example, migration could be used to reduce interference between transmitter and receiver. This would be applicable both when the receiver and the transmitter are in different AVs and when the receiver and the transmitter are in the same AV. Moreover, a transducer could be used such that the transducer would transmit the probing signal and received the reflected signal. By using migration, high correlation gain through with the received signal (wide beam) is obtained, as compared to physical beamforming with a narrow beam system. This allows the system to be more robust against interferences.

In another example, a geometric mean could be used to cancel out leakage. To avoid defocusing, data obtained from two or more different trajectories could be used to calculate two or more different maps, by means of one or more extra sensor(s) in the water volume. The data from the two different trajectories could be obtained by using two different AVs wherein each one moves following a different trajectory than the other one. For instance, one AV moves forming a circular trajectory having a radius $d_1$ and the other AV would move following another circular trajectory having a radius $d_2$ wherein $d_1$ and $d_2$ are different. Alternatively, the data from the two different trajectories could be obtained by using a single AV that moves first following one trajectory than then following another trajectory. For instance, the AV may move first forming a circular trajectory having a radius $d_1$ and after would move following another circular trajectory having a radius d; wherein $d_1$ and $d_2$ are different.

In another example, the duty cycle of continuous PRN code may be 100% as compared to the usual duty cycle of 1% to 10% for pulse based systems. This allows to obtain a better image of the seabed as more energy is concentrated in the water column.

In a further example, a waveform representation may be used for the probing signal such that is represented as complex signals comprising an imaginary and a real part wherein time delays will be represented as signal shifts. This allows to apply baseband processing to the received signals thereby providing a simpler system.

In the above examples, the system and method were employed in acoustic mapping/imaging of subsea surfaces, for instance at a depth of 100 metres of more. It should, however be understood that the method may also be employed at shallower depths. Alternatively or in addition, the method may also be applicable to sub-bottom imaging, although the achievable depth range is expected to be smaller in that case. In that case, soundwaves may be used to penetrate the seabed.

The received signals may be weighed such that strong specular and much weaker diffuse reflections are balanced in the correlation so that signals received from all points on the trajectory are included properly to avoid that the specular reflections are dominant.

In a further example, multiple carriers with possibly overlapping bandwidths may be used to modulate the probing signal in order to solve the water column problem.

In yet alternative embodiments, the method can be employed in acoustic imaging of subsea objects, in detection of unexploded ordinance, boulders, buried cables or pipes, in seismic imaging (i.e. earth subsurface mapping), in seismic cone penetration testing, in medical acoustic imaging, in radar mapping, or in ground penetrating radar.

LIST OF REFERENCE SYMBOLS

Similar reference numbers used in the description to indicate similar elements (differing only in the hundreds) have been omitted from the list below, but should be considered implicitly included.

10 mapping system
12 body of water (e.g. ocean water)
14 body of soil (e.g. submerged earth)
18 water surface
18 submerged surface (e.g. ocean floor)
20 first platform (e.g. ASV)
22 first float
24 first propulsion device
28 acoustic transmitter
28 first positioning device
30 first timer device
32 first data transmitter
34 first platform trajectory
40 second platform (e.g. ASV)
42 second float
44 second propulsion device
48 acoustic receiver
47 further acoustic receiver
48 second positioning device
50 second timer device
52 second data transmitter
54 second platform trajectory
60 target area
62 probing signal (w)
64 probing signal beam
66 temporal pattern probing signal
68 carrier signal
70 pseudo-random noise
72 portion of target area (e.g. volume element)
74 scatter signal component
78 response signal (r)
77 further response signal (r')
80 correlation strength ($J_k$)
82 point spread function image
84 map
90 vessel
92 processing device
X first transverse direction
Y second transverse direction
Z vertical direction
$Q_T$ first vehicle position
$Q_R$ second vehicle position
$v_s$ speed of sound in water
$\Delta z$ depth
$\varepsilon$ phase difference

The invention claimed is:

1. A method for mapping a target region of a space that comprises a plurality of portions with signal scatterers, the method comprising:
providing a signal transmitter and a signal receiver within signal range of the signal transmitter;
moving at least one of the signal transmitter and the signal receiver along a respective trajectory relative to the target region;
continuously transmitting, with the signal transmitter, a probing signal towards the target region;
continuously receiving, with the signal receiver, a response signal composed of a plurality of signal components that result from scattering of the probing signal by respective ones of the plurality of portions of the target region;
during the transmitting and receiving, repeatedly determining instantaneous positions of the moving at least one of the signal transmitter and receiver;

transforming the probing signal into a plurality of test signals, each test signal being associated with a signal propagation path via a selected portion of the target region, wherein the probing signal comprises a time sequence of noise with a predefined bandwidth; and correlating each of the plurality of test signals with the response signal in a time domain, to generate a map of correlation strength values associated with the selected portions of the target region, wherein the transforming of the probing signal for each selected portion of the target region comprises:

calculating a total delay time based on a propagation speed within a signal carrying medium and on a propagation distance from a first instantaneous position of the signal transmitter at a time that the probing signal was transmitted, towards the selected portion where the probing signal was scattered, and further towards a second instantaneous position of the signal receiver at a time the response signal was received, wherein the determined instantaneous positions comprise the first and the second instantaneous positions; and shifting parts or all of the probing signal in time, by correcting for the calculated total delay time, to obtain the test signal associated with the selected portion of the target region.

2. The method according to claim 1, wherein the correlating includes calculating, for each selected portion of the target region, a correlation strength between the response signal and the test signal corresponding with the selected portion, to determine the map of correlation strengths associated with respective selected portions of the target region.

3. The method according to claim 1, wherein the time sequence of noise with the predefined bandwidth in the probing signal is unique and has a total duration at least as long as a total time required by at least one of a first and second platforms to complete the respective trajectory.

4. The method according to claim 1, wherein the target region is a target area of a submerged surface, wherein the signal transmitter is an acoustic transmitter provided on a first waterborne platform, the signal receiver is an acoustic receiver provided on a second waterborne platform, and the probing signal is a continuous acoustic signal comprising the time sequence of noise with the predefined bandwidth.

5. The method according to claim 1, wherein the moving involves moving at least one of a first and second platform along a corresponding closed curve, while continuously transmitting the probing signal and receiving the response signal over the closed curve.

6. The method according to claim 1, wherein the transforming of the probing signal comprises shifting instantaneous values of the probing signal in time, such that the respective test signal associated with the respective portion of the target region is a sequence of amplitude values defined by:

$$\rho(t_R) = w(t_R - \Delta t)$$

wherein:

$t_R$ represents a time instance at which the receiver receives the response signal;

$\Delta t$ represents the total time delay time based on the signal propagation speed in the signal carrying medium and the propagation distance from the instantaneous position of the signal transmitter at time ($t_T$) that the probing signal was transmitted, via the selected portion where the probing signal was scattered, to the instantaneous position of the signal receiver at the time of receipt ($t_R$);

$\rho(t_R)$ represents the instantaneous value of test signal $\rho$ at time instant $t_R$; and $w(t_R-\Delta t)$ represents the instantaneous value of the probing signal at earlier time instant $t_R-\Delta t$.

7. The method according to claim 6, wherein the correlation strength for the respective portion of the target region is calculated using a discrete correlation operation defined by:

$$J(\xi, \eta, \zeta) = \sum_t \rho(t) \cdot r(t) = \sum_{t_R} w(t_R - \Delta t) \cdot r(t_R)$$

wherein:

J is the correlation strength (value) for the portion that is located at a location defined by voxel coordinates ($\xi, \eta, \zeta$)∈$\mathbb{R}^3$;

$\rho(t)$ represents the test signal $\rho$ as a function of time t; and r(t) represents the response signal as a function of time t; and wherein the method further comprises storing the map of calculated values of correlation strength as function of voxel coordinates ($\xi, \eta, \zeta$) of the respective portions of the target region.

8. The method according to claim 5, wherein the method further comprises:

calculating a point spread function, PSF, image for a hypothetical scatter source present only at the selected portion of the target region;

identifying a location of a true optimum correlation value in the PSF image; and identifying a plurality of locations of false excess correlation values in the PSF image.

9. The method according to claim 8, wherein the second platform includes a further signal receiver in proximity of the signal receiver, wherein the further signal receiver is configured to receive a further response signal composed of a plurality of further signal components that result from scattering of the probing signal by distinct portions of the target region, and to cooperate with the signal receiver by dynamically adjusting a phase difference between the response signal and the further response signal received; and wherein the method further comprises:

dynamically adjusting the phase difference as a function of instantaneous position of the second platform relative to the target region, in order to suppress components in the response signal and the further response signal originating from potential scatter sources in a region coinciding with false positive correlation values in the PSF image.

10. The method according to claim 1, wherein the time sequence of noise with a predefined bandwidth is a sequence of pseudo-random-noise bits, which is modulating a carrier signal using binary phase-shift keying.

11. The method according to claim 1, wherein the signal transmitter is configured to generate the probing signal having a primary emission beam with a substantially uniform spatial gain profile, at least within a solid angle that covers a target area during emitting of the probing signal.

12. A system for mapping a target region of a space that comprises a plurality of portions with signal scatterers, the system comprising a processing device configured to:

acquire a copy of a probing signal from a signal transmitter that has transmitted the probing signal towards the target region;

acquire a copy of a response signal from a signal receiver, the response signal being a composition of a plurality of signal components that result from scattering of the probing signal by respective ones of the plurality of portions of the target region;

acquire location and timing data from the signal transmitter and/or receiver representing instantaneous positions of the signal transmitter and/or receiver repeatedly determined during transmitting and receiving;

transform the copy of the probing signal into a plurality of test signals, each test signal being associated with a signal propagation path via a selected portion of the target region;

correlate each of the plurality of test signals with the copy of the response signal in a time domain, to calculate a map of correlation strength values associated with respective selected portions of the target region;

wherein at least one of the signal transmitter and the signal receiver was moving along a respective trajectory relative to the target region while transmitting the probing signal or receiving the response signal respectively;

and wherein the probing signal comprises a time sequence of noise with a predefined bandwidth, wherein the transforming of the probing signal for each selected portion of the target region comprises:

calculating a total delay time based on a propagation speed within a signal carrying medium and on a propagation distance from a first instantaneous position of the signal transmitter at a time that the probing signal was transmitted, towards the selected portion where the probing signal was scattered, and further towards a second instantaneous position of the signal receiver at a time $t_R$ the response signal was received, wherein the determined instantaneous positions comprise the first and the second instantaneous positions; and shifting parts or all of the probing signal in time, by correcting for the calculated total delay time ($\Delta t$), to obtain the test signal associated with the selected portion of the target region.

13. The system according to claim 12, further comprising the signal transmitter and the signal receiver, wherein at least one of the signal transmitter and signal receiver is adapted to be moved along a respective trajectory relative to the target region while transmitting the probing signal or receiving the response signal, respectively.

14. The system according to claim 13, wherein the signal receiver is an omni-directional receiver, adapted to simultaneously receive multiple signal components that are reflected by distinct portions in the target region.

15. The system according to claim 13, wherein the signal transmitter is adapted to generate the probing signal having a predominantly conical intensity distribution that is directed predominantly vertically downwards into the signal carrying medium and towards an expected location of the target region.

16. The system according to claim 12, wherein the processing device is part of a remote processing centre or a cloud computing facility.

17. A non-transitory computer readable medium storing instructions, which when executed by at least one processor, causes the at least one processor to:

acquire a copy of a probing signal from a signal transmitter that has transmitted the probing signal towards a target region;

acquire a copy of a response signal from a signal receiver, the response signal being a composition of a plurality of signal components that result from scattering of the probing signal by respective ones of portions of the target region;

acquire location and timing data from the signal transmitter and/or receiver representing instantaneous positions of the signal transmitter and/or receiver repeatedly determined during transmitting and receiving;

transform the copy of the probing signal into a plurality of test signals, each test signal being associated with a signal propagation path via a selected portion of the target region;

correlate each of the plurality of test signals with the copy of the response signal in a time domain, to calculate a map of correlation strength values associated with respective selected portions of the target region, wherein at least one of the signal transmitter and the signal receiver was moving along a respective trajectory relative to the target region while transmitting the probing signal or receiving the response signal respectively, wherein the probing signal comprises a time sequence of noise with a predefined bandwidth, wherein the transforming of the probing signal for each selected portion of the target region comprises:

calculating a total delay time based on a propagation speed within a signal carrying medium and on a propagation distance from a first instantaneous position of the signal transmitter at a time that the probing signal was transmitted, towards the selected portion where the probing signal was scattered, and further towards a second instantaneous position of the signal receiver at a time the response signal was received, wherein the determined instantaneous positions comprise the first and the second instantaneous positions; and shifting parts or all of the probing signal in time, by correcting for the calculated total delay time, to obtain the test signal associated with the selected portion of the target region.

18. The non-transitory computer readable medium according to claim 17, further comprising the signal transmitter and the signal receiver, wherein at least one of the signal transmitter and signal receiver is adapted to be moved along a respective trajectory relative to the target region while transmitting the probing signal or receiving the response signal, respectively.

19. The non-transitory computer readable medium according to claim 18, wherein the signal receiver is an omni-directional receiver, adapted to simultaneously receive multiple signal components that are reflected by distinct portions in the target region.

20. The non-transitory computer readable medium according to claim 18, wherein the signal transmitter is adapted to generate the probing signal having a predominantly conical intensity distribution that is directed predominantly vertically downwards into the signal carrying medium and towards an expected location of the target region.

* * * * *